(12) United States Patent
Hashimoto et al.

(10) Patent No.: US 9,377,773 B2
(45) Date of Patent: Jun. 28, 2016

(54) MOTOR CONTROLLER FOR PERFORMING CORRECTION WHEN DIRECTION OF ROTATION IS REVERSED

(71) Applicant: FANUC Corporation, Yamanashi (JP)

(72) Inventors: Shoutarou Hashimoto, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/692,793

(22) Filed: Apr. 22, 2015

(65) Prior Publication Data

US 2015/0309500 A1 Oct. 29, 2015

(30) Foreign Application Priority Data

Apr. 24, 2014 (JP) .................. 2014-090343

(51) Int. Cl.
| | | |
|---|---|---|
| *H02K 7/10* | (2006.01) | |
| *G05B 11/01* | (2006.01) | |
| *G05B 19/404* | (2006.01) | |
| *G05B 19/19* | (2006.01) | |
| *G05B 19/416* | (2006.01) | |

(52) U.S. Cl.
CPC .............. *G05B 19/404* (2013.01); *G05B 19/19* (2013.01); *G05B 19/416* (2013.01)

(58) Field of Classification Search
CPC .... G05B 19/404; G05B 19/19; G05B 19/416; G05B 2219/42087
USPC .................. 318/630, 560, 561, 631, 639, 632
See application file for complete search history.

(56) References Cited

U.S. PATENT DOCUMENTS

| | | | |
|---|---|---|---|
| 8,508,171 B2 * | 8/2013 | Miyaji ................. | G05B 19/404 318/560 |
| 2003/0030401 A1 | 2/2003 | Fujishima | |
| 2010/0295495 A1 | 11/2010 | Iwashita et al. | |

FOREIGN PATENT DOCUMENTS

| | | |
|---|---|---|
| JP | S63-078206 A | 4/1988 |
| JP | H02-093711 A | 4/1990 |
| JP | H07-013631 A | 1/1995 |
| JP | 2003-048136 A | 2/2003 |
| JP | 2005-304155 A | 10/2005 |
| JP | 2010-271854 A | 12/2010 |

\* cited by examiner

*Primary Examiner* — Bentsu Ro
*Assistant Examiner* — Zemenay Truneh
(74) *Attorney, Agent, or Firm* — Hauptman Ham, LLP

(57) ABSTRACT

A motor controller is configured to judge whether or not the amount of displacement of a driven body after the direction of movement of the driven body is reversed, exceeds a predetermined threshold value, and whether or not the amount of displacement of a motor after the direction of movement of the motor is reversed, exceeds another predetermined threshold value. When the amount of displacement of the driven body exceeds the threshold value, or the amount of displacement of the motor exceeds a second threshold value, the correction of the commands to the motor is terminated.

2 Claims, 3 Drawing Sheets

MOTOR CONTROLLER FOR PERFORMING CORRECTION WHEN DIRECTION OF ROTATION IS REVERSED

RELATED APPLICATIONS

The present application claims priority to Japanese Application Number 2014-090343, filed Apr. 24, 2014, the disclosure of which is hereby incorporated by reference herein in its entirety.

BACKGROUND ART

1. Field of the Invention

The present invention relates to a motor controller.

2. Description of the Related Art

According to a known control method for controlling a motor, when the direction of movement of a driven body driven by the motor is reversed, an amount of correction is added to a command given to the motor in order to assist in the reverse movement and overcome the friction generated on the driven body, a transmission or the like. This kind of correction even hinders the realization of desired movement of the driven body during a normal operation, and accordingly it is necessary to terminate the correction after the driven body is moved over a certain distance in the reverse direction.

For example, JP H2-093711 A discloses a controller which performs a correction by adding a certain amount of correction to a speed command when the rotational direction of the motor is reversed, wherein the correction is terminated when an integrated value of speeds fed back from the motor (i.e. the amount of displacement of the motor) reaches a predetermined value.

However, in the case of determining the timing of termination of the correction based only on monitoring the amount of displacement of the motor, it is not possible to accurately determine the movement of the driven body after the movement direction is reversed. Namely, an accurate correspondence between the amount of displacement of the motor and the amount of displacement of the driven body is unknown, and therefore it is difficult to terminate the correction at an appropriate time.

On the other hand, in the case of determining the timing of termination of the correction based only on monitoring the amount of displacement of the driven body after the direction of movement is reversed, if there is an elastic body such as a spring element incorporated into a transmission between the motor and the driven body, the correction may not be terminated at an appropriate time. Specifically, in such a case, when the movement direction of the driven body is reversed, elastic energy is accumulated in the elastic body. This may result in delayed movement of the driven body due to the elastic energy being released after the movement direction is reversed, even if the correction is properly terminated when the amount of displacement of the driven body reaches a predetermined value. Consequently, there is a possibility of delaying the termination of the correction.

Therefore, there is a demand for a motor controller which terminates a correction at an appropriate time when the movement direction is reversed.

SUMMARY OF THE INVENTION

According to a first aspect of the present application, there is provided a motor controller for controlling a motor which drives a driven body, comprising: a first displacement detector configured to detect an amount of displacement of the driven body; a second displacement detector configured to detect an amount of displacement of the motor; a correction part configured to add an amount of correction to a speed command or a torque command to the motor when a movement direction of the driven body is reversed; a judgment part configured to judge whether or not the amount of displacement of the driven body after the movement direction of the driven body is reversed, exceeds a first threshold value, and whether or not the amount of displacement of the motor after the movement direction of the motor is reversed, exceeds a second threshold value; and a correction terminating part configured to terminate a correction of the speed command or the torque command by the correction part when the amount of displacement of the driven body exceeds the first threshold value or when the amount of displacement of the motor exceeds the second threshold value.

According to a second aspect of the present invention there is provided a motor controller for controlling a motor which drives a driven body, comprising: a first displacement detector configured to detect an amount of displacement of the driven body; a second displacement detector configured to detect an amount of displacement of the motor; a correction part configured to add an amount of correction to a speed command or a torque command to the motor when a movement direction of the driven body is reversed; a judgment part configured to judge whether or not the amount of displacement of the driven body after the movement direction of the driven body is reversed, exceeds a first threshold value, and whether or not the amount of displacement of the motor after the movement direction of the motor is reversed, exceeds a third threshold value; and a correction terminating part configured to terminate a correction of the speed command or the torque command by the correction part, when the amount of displacement of the driven body exceeds the first threshold value; wherein the correction part is configured to reduce the amount of correction added to the speed command or the torque command by the correction part when the amount of displacement of the motor exceeds the third threshold value.

These and other objects, features and advantages of the present invention will become more apparent in light of the detailed description of exemplary embodiments thereof as illustrated in the drawings.

DETAILED DESCRIPTION OF THE INVENTION

Figure 1:
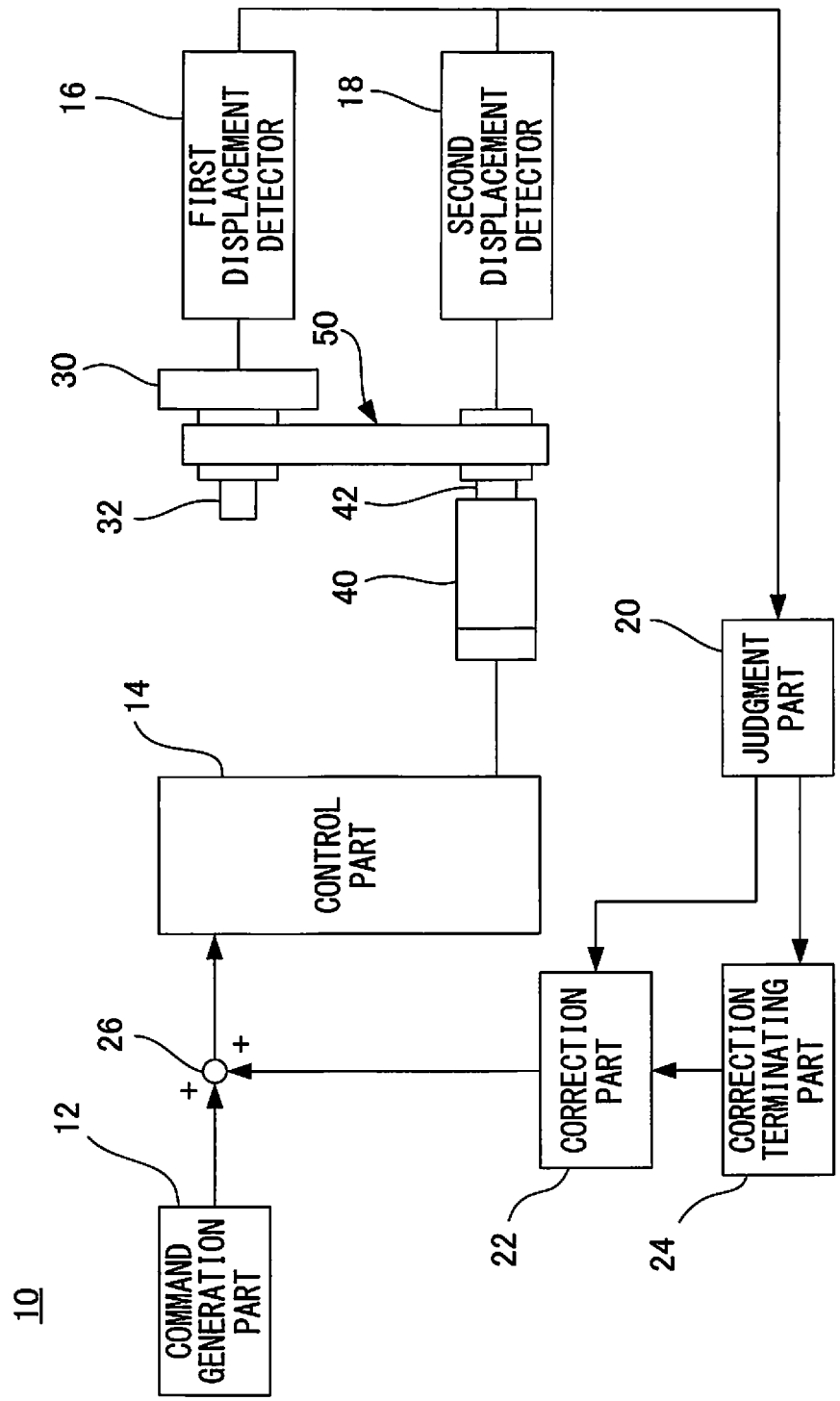
FIG. 1 is a block diagram illustrating functions of a motor controller according to one embodiment.

Hereinafter, embodiments of the present invention will be described referring to the drawings. Constituent elements of the illustrated embodiments may be modified in size in relation to one another as necessary to facilitate the understanding of the present inventions. Further, the same reference numbers are used for the same or corresponding constitutional elements over the drawings.

FIG. 1 illustrates a block diagram showing functions of a motor controller 10 according to one embodiment. The motor controller 10 controls a motor 40 which drives a driven body such as a table 30. An output shaft 42 of the motor 40 is connected to a rotating shaft 32 of the table 30 via a power transmission part 50, so that the table 30 can be rotated together with the motor 40. The power transmission part 50 is a known transmission such as a belt or gears. Alternatively, the table 30 may be a linear type table which moves linearly in response to the rotation of the motor 40. In this case, the power transmission part 50 is provided with a conversion mechanism, such as a ball screw, which converts the rotational movement of the motor 40 to linear movement.

The motor controller 10 includes a command generation part 12, a control part 14, a first displacement detector 16, a second displacement detector 18, a judgment part 20, a correction part 22 and a correction terminating part 24. The motor controller 10 has a hardware configuration including a CPU for implementing a variety of arithmetic processes, a ROM which stores a control program and parameters etc., and a RAM which temporarily stores the results of the processing by the CPU and detected values of the sensors etc., although these components are not illustrated in the drawings.

The command generation part 12 generates commands to control the motor 40 according to, for example, a predetermined control program. The commands may include, for example, speed commands and torque commands.

The control part 14 controls the movement of the motor 40 by supplying the motor 40 with a specified current according to the command output from the command generation part 12. Specifically, the control part 14 controls the amount of electric current to be supplied to the motor 40, based on the amount of deviation between the speed command or the torque command and the detected values of the speed or torque of the motor 40 fed back to the control part 14.

The first displacement detector 16 detects the amount of displacement of the table 30 using a known sensor. For example, the amount of displacement of the table 30 may be obtained by detecting the rotational angle of the rotational shaft 32 of the table 30. In the case of a table 30 designed to move linearly, for example, the amount of displacement of the table 30 may be detected by a displacement sensor. Further, the first displacement detector 16 is also used as a detector for detecting the reversal of the movement direction of the table 30. Namely, the first displacement detector 16 may be designed to detect the reversal of the movement direction of the table 30 by continuously monitoring the amount of displacement of the table 30.

The second displacement detector 18 detects the amount of displacement of the motor 40 by using a known sensor. The amount of displacement of the motor 40 may be obtained by, for example, a rotary encoder. A magnetic, optical or any other type of rotary encoder may be used. Further, the second displacement detector 18 may be also used as a detector for detecting the reversal of the rotational direction of the motor 40. Namely, the second displacement detector 18 may be designed to detect the reversal of the movement direction of the motor 40 by constantly monitoring the amount of displacement of the motor 40.

The judgment part 20 judges whether or not the amount of displacement of the table 30 exceeds a first threshold value by comparing the amount of displacement of the table 30 after the table 30 reverses its direction of movement with the first threshold value. The reversal of the movement direction of the table 30 and the amount of displacement of the table 30 after the reversal are both detected by the first displacement detector 16. The first threshold value is determined as necessary according to the amount of displacement of the table 30 which is regarded as being large enough to terminate the correction and switch to normal control.

Further, the judgment part 20 judges whether or not the amount of displacement of the motor 40 exceeds a second threshold value by comparing the amount of displacement of the motor 40 after the rotational direction of the motor 40 is reversed with a second threshold value. The reversal of the rotational direction of the motor 40 and the amount of displacement of the motor 40 after the reversal are both detected by the second displacement detector 18. The second threshold value is determined as necessary according to the amount of displacement of the motor 40 which is regarded as being large enough to terminate the correction and switch to normal control. For example, the first and second threshold values can each be determined empirically.

The correction part 22 adds a certain correction amount to a command outputted by the command generation part 12 for the purpose of smoothing the movement of the table 30 when the movement direction of the table 30 is reversed. The amount of correction outputted by the correction part 22 is added to the command given to the motor 40 by an adder 26. This type of correction by the correction part 22 starts in synchronization with the generation of command to reverse the direction of rotation of the motor 40. This correction continues until it is terminated by the correction terminating part 24, which will be described later.

The correction terminating part 24 terminates the correction by the correction part 22 when the judgment part 20 judges that the amount of displacement of the table 30 exceeds the first threshold value or that the amount of displacement of the motor 40 exceeds the second threshold value.

Figure 2:
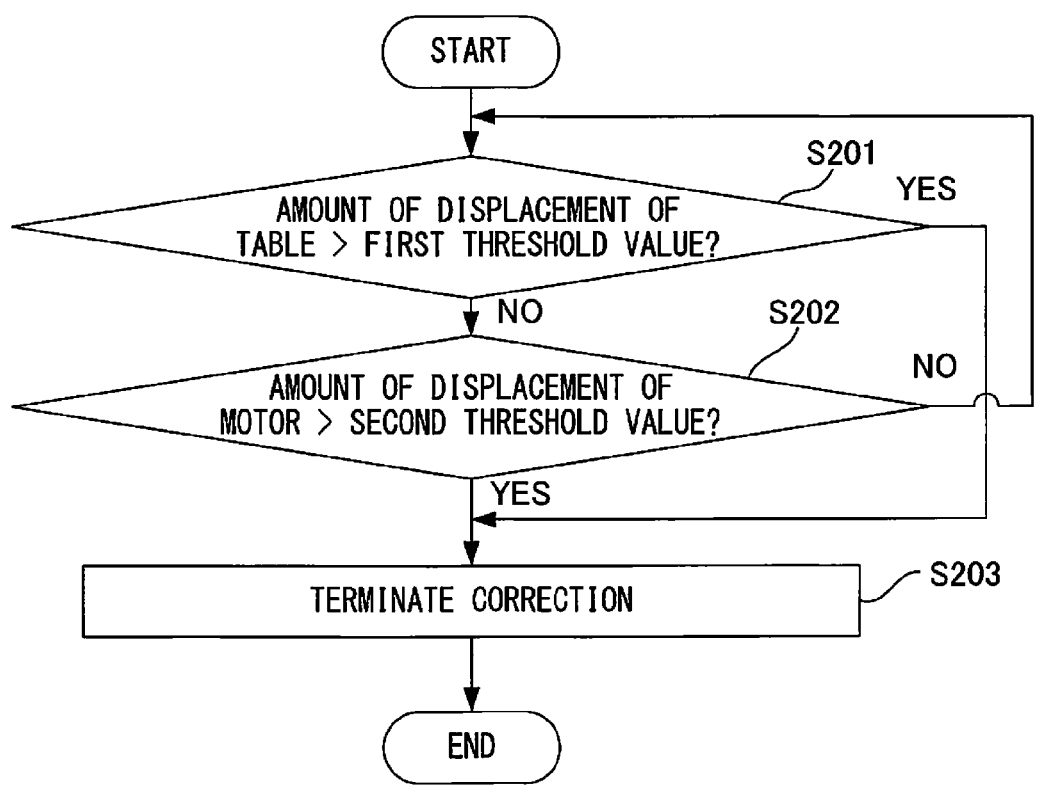
FIG. 2 is a flowchart illustrating the flow of a correction process performed by a motor controller according to a first embodiment.

FIG. 2 is a flowchart illustrating the flow of correction processing carried out by the motor controller 10 according to the first embodiment. The correction processing carried out by the correction part 22 is started, for example, when the speed command or the torque command supplied to the motor 40 is changed from a positive value to a negative value, or vice versa.

When the correction processing is started, the judgment part 20 judges at step S201 whether or not the amount of displacement of the table 30 exceeds the first threshold value. Specifically, the amount of displacement of the table 30 to be compared is the amount of displacement of the table 30 after the movement direction of the table 30 is reversed, and is detected by the first displacement detector 16. If it is judged at step S201 that the amount of displacement of the table 30 exceeds the first threshold value, the process proceeds to step S203 at which the correction is terminated by the correction terminating part 24.

If it is judged at step S201 that the amount of displacement of the table 30 is not more than the first threshold value, the process proceeds to step S202. At step S202, the judgment part 20 judges whether or not the amount of displacement of the motor 40 exceeds the second threshold value. The amount of displacement of the motor 40 is the amount of displacement after the rotational movement of the motor 40 is reversed, and is detected by the second displacement detector 18. If it is judged at step S202 that the amount of displacement of the motor 40 exceeds the second threshold value, the process progresses to S203 at which the correction is terminated by the correction terminating part 24.

If it is judged that the amount of displacement of the motor 40 is not more than the second threshold value, the process returns to step S201. Then, the processes of step S201 and S202 are carried out repeatedly with a predetermined control cycle until the correction processing is terminated at step S203.

According to this embodiment, both the amount of displacement of the motor 40 and the amount of displacement of the table 30 are monitored, and when either one of them exceeds the corresponding threshold value, the correction carried out by the correction part 22 is terminated. Accordingly, the correction can be terminated at an appropriate timing, which depends on the machine configuration of the power transmission part 50 and the table 30. For example, even if it is configured such that an elastic body such as a spring element is provided between the table 30 and the motor 40, the addition of the amount of correction can be appropriately terminated based on the amount of displacement of the motor 40, since the amount of displacement of the motor 40 is monitored as well as the amount of displacement of the table 30. This can prevent elastic energy from being excessively accumulated in the elastic body due to a delay of the termination of the correction.

Figure 3:
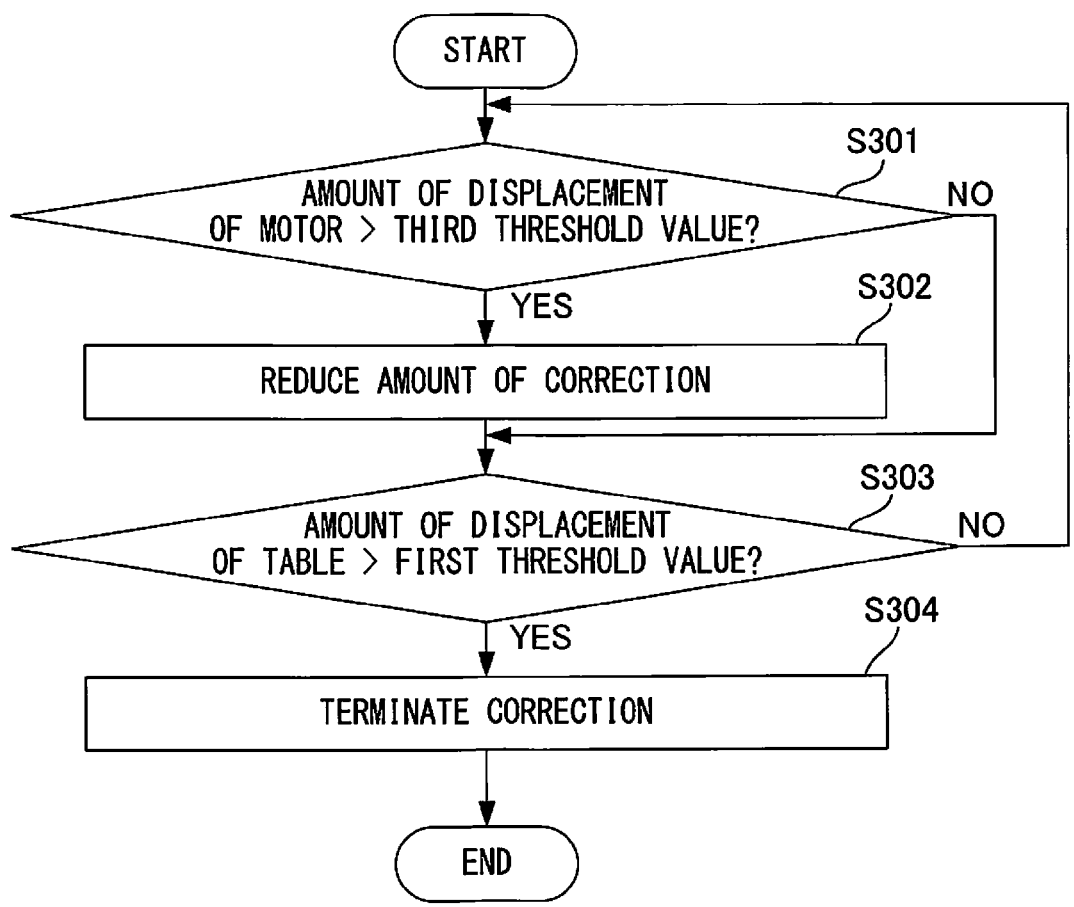
FIG. 3 is a flowchart illustrating the flow of a correction process performed by a motor controller according to a second embodiment.

FIG. 3 is a flowchart which illustrates the flow of correction processing carried out by a motor controller 10 according to a second embodiment. This embodiment differs from the first embodiment in that when the amount of displacement of the motor 40 exceeds a predetermined threshold value (hereinafter referred to as "the third threshold value"), the amount of correction added to a command supplied to the motor 40 by the correction part 22 is reduced. The third threshold value may be determined empirically and may be for example, a smaller value than the aforementioned second threshold value, although not limited thereto.

At step S301, the judgment part 20 judges whether or not the amount of displacement of the motor 40 exceeds the third threshold. In the case where the judgment part 20 judges that the amount of displacement of the motor 40 exceeds the third threshold value, the process progresses to S302 at which the amount of correction inputted into the adder 26 from the correction part 22 is reduced. It should be noted that the amount of displacement of the motor 40 is the amount of displacement of the motor 40 after the rotational direction of the motor 40 is reversed, and is detected by the second displacement detector 18 as in the aforementioned embodiment.

On the other hand, in the case where the judgment part 20 judges that the amount of displacement of the motor 40 is not more than the third threshold value, the process proceeds to step S303. At step S303, the judgment part 20 judges whether or not the amount of displacement of the table 30 exceeds the first threshold value in the same way as step 202 in FIG. 2. If it is judged that the amount of displacement of the table 30 exceeds the first threshold value, the process proceeds to step S304 and the correction terminating part 24 terminates the correction processing carried out by the correction part 22.

On the other hand, if the judgment part 20 judges that the amount of displacement of the table 30 is not more than the first threshold value, the process returns to step S301. The processes of steps S301 to S303 are repeated carried out with a predetermined control cycle until the correction processing is terminated at step S304.

According to the present embodiment, after the amount of displacement of the motor has reached the specified value after the direction of rotation is reversed, the amount of correction added to the speed command or the torque command is reduced. Therefore, even if an elastic body is incorporated into the power transmission part 50 between the motor 40 and the table 30, the elastic energy stored in the elastic body is reduced during the reversal. Because of this, excessive movement of the table 30 caused by the elastic energy can be prevented, and therefore the termination of the correction can be prevented from being delayed.

Effect of the Invention

According to the motor controller configured as described above, both the amount of displacement of the motor and the amount of displacement of the driven body are monitored. Further, the timing of terminating the correction processing is determined by comparing the amount of displacement of the motor after the rotational direction of the motor is reversed and the amount of displacement of the driven body after the movement direction of the driven body is reversed with the corresponding threshold values, respectively. Accordingly, the appropriate timing of terminating the correction processing during the reversal can be achieved, regardless of the structural configurations of the driven body and the transmission between the driven body and the motor or the like.

Further, according to the motor controller configured to reduce the amount of correction when the amount of displacement of the motor after the rotational direction is reversed exceeds a predetermined threshold value, the elastic energy stored in the elastic body during the reversal is reduced. Therefore, a delay of the timing of terminating the correction processing due to the elastic energy can be prevented.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A motor controller for controlling a motor which drives a driven body, comprising:
    a first displacement detector configured to detect an amount of displacement of the driven body;
    a second displacement detector configured to detect an amount of displacement of the motor;
    a correction part configured to add an amount of correction to a speed command or a torque command to the motor when a movement direction of the driven body is reversed;
    a judgment part configured to judge whether or not the amount of displacement of the driven body after the movement direction of the driven body is reversed, exceeds a first threshold value, and whether or not the amount of displacement of the motor after the movement direction of the motor is reversed, exceeds a second threshold value; and
    a correction terminating part configured to terminate a correction of the speed command or the torque command by the correction part when the amount of displacement of the driven body exceeds the first threshold value or when the amount of displacement of the motor exceeds the second threshold value.

2. A motor controller for controlling a motor which drives a driven body, comprising:
    a first displacement detector configured to detect an amount of displacement of the driven body;
    a second displacement detector configured to detect an amount of displacement of the motor;

a correction part configured to add an amount of correction to a speed command or a torque command to the motor when a movement direction of the driven body is reversed;

a judgment part configured to judge whether or not the amount of displacement of the driven body after the movement direction of the driven body is reversed, exceeds a first threshold value, and whether or not the amount of displacement of the motor after the movement direction of the motor is reversed, exceeds a third threshold value; and a correction terminating part configured to terminate a correction of the speed command or the torque command by the correction part, when the amount of displacement of the driven body exceeds the first threshold value;

wherein the correction part is configured to reduce the amount of correction added to the speed command or the torque command by the correction part when the amount of displacement of the motor exceeds the third threshold value.

* * * * *